US010964325B2

(12) United States Patent
Gilbert

(10) Patent No.: US 10,964,325 B2
(45) Date of Patent: *Mar. 30, 2021

(54) ASYNCHRONOUS VIRTUAL ASSISTANT

(71) Applicant: AT&T Intellectual Property I, L.P., Atlanta, GA (US)

(72) Inventor: Mazin E. Gilbert, Warren, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/682,609

(22) Filed: Nov. 13, 2019

(65) Prior Publication Data

US 2020/0082825 A1    Mar. 12, 2020

Related U.S. Application Data

(63) Continuation of application No. 15/351,863, filed on Nov. 15, 2016, now Pat. No. 10,515,632.

(51) Int. Cl.
| | | |
|---|---|---|
| *G10L 15/00* | (2013.01) | |
| *G10L 15/22* | (2006.01) | |
| *G10L 15/18* | (2013.01) | |
| *G10L 13/00* | (2006.01) | |

(52) U.S. Cl.
CPC .............. *G10L 15/22* (2013.01); *G10L 13/00* (2013.01); *G10L 15/1822* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 5,748,841 | A | 5/1998 | Morin et al. |
| 5,864,815 | A | 1/1999 | Rozak et al. |
| 6,088,671 | A | 7/2000 | Gould et al. |
| 6,122,613 | A | 9/2000 | Baker |
| 6,192,343 | B1 | 2/2001 | Morgan et al. |

(Continued)

FOREIGN PATENT DOCUMENTS

| | | |
|---|---|---|
| DE | 102010033117 A1 | 2/2012 |
| EP | 1606795 B1 | 8/2009 |
| WO | 8704292 | 7/1987 |

OTHER PUBLICATIONS

E. C. Paraiso and J. -. A. Barthes, "An intelligent speech interface for personal assistants in R&D projects," Proceedings of the Ninth International Conference on Computer Supported Cooperative Work in Design, 2005., Coventry, UK, 2005, pp. 804-809 vol. 2, doi: 10.1109/CSCWD.2005.194288. (Year: 2005).*

(Continued)

*Primary Examiner* — Edgar X Guerra-Erazo
(74) *Attorney, Agent, or Firm* — Guntin & Gust, PLC; Dana Lemoine

(57) ABSTRACT

Aspects of the subject disclosure may include, for example, obtaining an input, e.g., from a human operator, comprising a request. A number of activities are identified, e.g., by a virtual assistant, based on the request. Performance of the number of activities is facilitated, e.g., by the virtual assistant. A result is determined, e.g., by the virtual assistant, based on the performance of the number of activities, wherein a response to the request is based on the result. Other embodiments are disclosed.

20 Claims, 7 Drawing Sheets

(56) References Cited

U.S. PATENT DOCUMENTS

| | | |
|---|---|---|
| 6,253,176 B1 | 6/2001 | Janek et al. |
| 6,317,711 B1 | 11/2001 | Muroi et al. |
| 6,636,831 B1 | 10/2003 | Mezey et al. |
| 7,080,014 B2 | 7/2006 | Roura et al. |
| 7,203,635 B2 | 4/2007 | Oliver et al. |
| 7,409,344 B2 | 8/2008 | Gurram et al. |
| 7,433,823 B1 | 10/2008 | Grant et al. |
| 7,778,831 B2 | 8/2010 | Chen |
| 8,010,358 B2 | 8/2011 | Chen |
| 8,219,407 B1 | 7/2012 | Roy et al. |
| 8,346,563 B1 * | 1/2013 | Hjelm .................. G10L 15/1822 704/275 |
| 8,429,106 B2 | 4/2013 | Downs et al. |
| 8,738,380 B2 | 5/2014 | Baldwin et al. |
| 8,756,057 B2 | 6/2014 | Miller et al. |
| 8,788,271 B2 | 7/2014 | Gurram et al. |
| 8,793,137 B1 | 7/2014 | Roy et al. |
| 8,996,375 B1 | 3/2015 | Gagnon et al. |
| 9,031,845 B2 | 5/2015 | Kennewick, Jr. et al. |
| 9,269,374 B1 | 2/2016 | Conway et al. |
| 9,384,729 B2 | 7/2016 | Syed et al. |
| 10,515,632 B2 * | 12/2019 | Gilbert .................... G10L 15/22 |
| 2003/0014254 A1 | 1/2003 | Zhang et al. |
| 2003/0154072 A1 | 8/2003 | Young et al. |
| 2004/0030750 A1 | 2/2004 | Moore et al. |
| 2005/0137870 A1 | 6/2005 | Mizutani et al. |
| 2006/0122840 A1 | 6/2006 | Anderson et al. |
| 2006/0156389 A1 | 7/2006 | Brown et al. |
| 2006/0206340 A1 | 9/2006 | Silvera et al. |
| 2008/0189096 A1 | 8/2008 | Apte et al. |
| 2009/0100050 A1 | 4/2009 | Erol et al. |
| 2012/0330934 A1 | 12/2012 | Duboue et al. |
| 2013/0159233 A1 | 6/2013 | Mason et al. |
| 2013/0241952 A1 | 9/2013 | Smith et al. |
| 2014/0278390 A1 | 9/2014 | Kingsbury et al. |
| 2014/0280634 A1 | 9/2014 | Mansfield et al. |
| 2015/0019216 A1 | 1/2015 | Singh et al. |
| 2015/0039319 A1 | 2/2015 | Mei et al. |
| 2015/0169284 A1 * | 6/2015 | Quast .................. G06F 16/9535 704/275 |
| 2015/0278285 A1 | 10/2015 | Meng et al. |
| 2015/0348549 A1 | 12/2015 | Giuli et al. |
| 2016/0078773 A1 * | 3/2016 | Carter ..................... G09B 7/02 434/353 |
| 2016/0217472 A1 | 7/2016 | Podgorny et al. |
| 2017/0017501 A1 * | 1/2017 | Quast ..................... G06F 3/048 |
| 2018/0137856 A1 | 5/2018 | Gilbert |

OTHER PUBLICATIONS

"XEP-0327: Rayo", http://xmpp.org/extensions/xep-0327.html, Discloses the Rayo protocol that allows third-party control over media sessions and a variety of advanced media resources such as speech recognizers, speech synthesizers and audio/video recorders., Aug. 18, 2013.

Elgan, Mike , "Why email is a bettervirtual assistant", http://www.computerworld.com/article/3002248/collaboration/why-email-is-a-better-virtual-assistant.html, Discloses virtual assistants such as how Google uses "natural language understanding technology" to identify incoming messages as "to do" items, which can be processed asynchronously., Nov. 9, 2015.

* cited by examiner

100

200

300

ASYNCHRONOUS VIRTUAL ASSISTANT

CROSS REFERENCE TO RELATED APPLICATIONS

This application is a continuation of U.S. patent application Ser. No. 15/351,863 filed Nov. 15, 2016. The contents of the foregoing is hereby incorporated by reference into this application as if set forth herein in full.

FIELD OF THE DISCLOSURE

The subject disclosure relates to an Asynchronous Virtual Assistant.

BACKGROUND

Recent developments have resulted in new and improved computer programs or agents that simulate intelligent conversations with one or more human users. Such interactive speech services are sometimes referred to as "chatbots" or "chatterbots." Apple Inc.'s iOS operating system provides a SIRI® personal assistant, as one example of a voice-activated personal agent that can understand human speech and act based on a specified set of actions. SIRI is registered trademark of Apple Inc. Personal agents can be used today for both enterprise and consumer services using either chat or speech.

Currently available personal agents are understood to operate in a dialog form, sometimes referred to as a "tic-tac flow" format. Namely, the user says something and the machine responds. The user may follow with another instruction to which the machine similarly responds. Such interactions can be considered synchronous, e.g., in that machine responses immediately follow or are otherwise synchronized to a preceding dialog.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing a virtual assistant that responds to user task orders, without necessarily requiring a dialog with the user. The user can provide simple tasks and/or more complicated tasks that include multiple facets or sub-tasks. The virtual assistant responds to the orders by identifying micro-actions and/or macro-actions that when executed, enact or otherwise accomplish a requested task. Other embodiments are described in the subject disclosure.

One or more aspects of the subject disclosure include a process that includes obtaining, by a processing system including a processor, a human interpretable input comprising a primary instruction. A number of secondary instructions are identified based on the primary instruction and initiation of the number of secondary instructions are facilitated. A result is determined based on the number of secondary instructions, wherein a response to the primary instruction is based on the result.

One or more aspects of the subject disclosure include a system having a processing system including a processor and a memory that stores executable instructions that, when executed by the processing system, facilitate performance of operations. The operations include obtaining a user input that includes an instruction. A number of instruction components are identified, wherein a response to the instruction is based on execution of the number of instruction components, and execution of the number of instruction components is facilitated. A response is determined based on the execution of the number of instruction components.

One or more aspects of the subject disclosure include a machine-readable storage medium, including executable instructions that, when executed by a processing system including a processor, facilitate performance of operations. The operations obtaining an input from equipment of a user comprising a request. A number of activities are identified based on the request, and performance of the number of activities is facilitated. A result is determined based on the performance of the plurality of activities, wherein a response to the request is based on the result.

Figure 1:
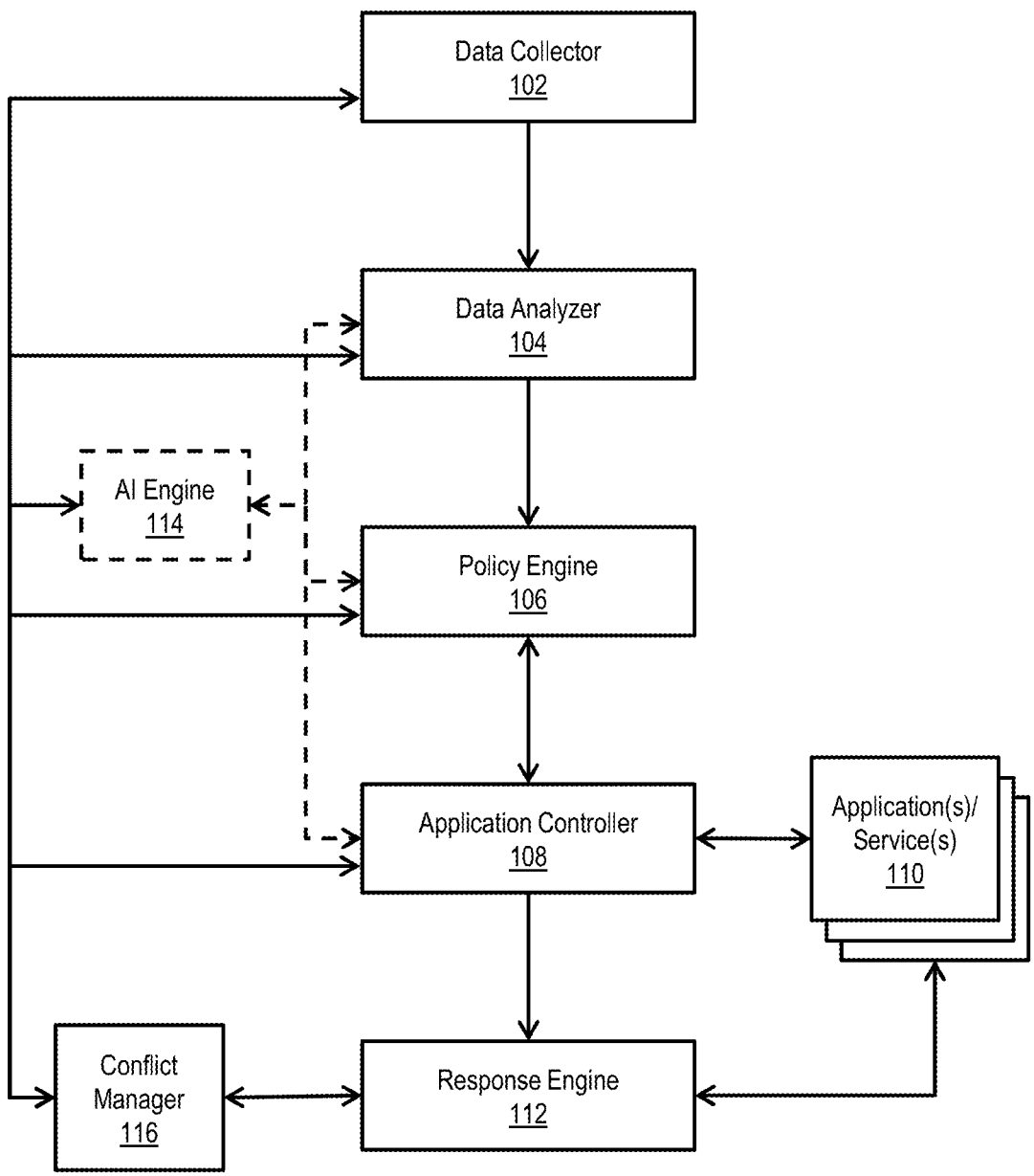
FIG. 1 depicts an illustrative embodiment of a system that supports an asynchronous virtual assistant.

FIG. 1 depicts an illustrative embodiment of a system 100 that provides an asynchronous virtual assistant. The system 100 includes a data collector 102, a data analyzer 104, a policy or rules engine 106, an application or service controller 108, and a response engine 112. The data collector 102 captures input from a user. The input can include one or more of an instruction, an order, e.g., a task order, or a request. It is understood that any such instruction can be directed to a perceived virtual assistant, with an understanding that the virtual assistant will act upon the instruction to undertake one or more activities and/or to produce one or more responses, results or output that preferably fulfill or otherwise satisfy the task order. It is understood that the virtual assistant, as implemented by the example system 100, undertakes one or more actions, activities or process steps that respond to the input, with a goal of fulfilling the task order to produce a desired result for the user.

The user input can take on one or more forms, such as voice or speech, non-verbal sounds, text, click streams, gestures and the like. To that end, the data collector can include one or more of an audio sensor, such as a microphone, an optical sensor, such as a still or video camera, a physical user interface, such as a keyboard, or control panel, and/or a graphical user interface. A microphone sensor includes a transducer that produces an electrical signal in response to detected sounds, such as the speech or vocalizations of the user. In some embodiments, the resulting electrical signal is referred to as an audio signal that can be processed as an analog signal, and/or digitized, e.g., using an analog-to-digital converter and processed as a digital signal.

It is understood that in at least some embodiments intelligence can be obtained from the audio signal, e.g., by converting speech-to-text. In such instances, a textual representation of detected audio, e.g., the user's vocalizations, is provided to the data analyzer 104 for further processing. Alternatively or in addition, intelligence can be obtained from a gesture-based interface, e.g., a camera and/or camera array trained upon the user. For example, the user waves a hand towards the interface, as though waving for a live assistant to come closer. The gesture can be interpreted as an instruction to begin an instructional session. Consider the system 100 responding to the hand gesture, such as a raising or a wave of a hand, with an audible response, "Do you need me?" or "Is there something I can do for you?" Such response can also prepare the system to accept the following voice communications. In this manner, the system 100 can be running in a background sense, without responding to speech until queued by an appropriate gesture.

In at least some embodiments, audio input can include non-verbal cues, such as a speaker's volume, intonation, non-verbal utterances, including hand clap, a tap, whistle and the like. Such cues can be interpreted by the system, e.g., as an indication of a particular function or action, such as directing telephone calls to voice mail, adjusting office lighting, music and the like.

It is understood that in at least some embodiments, the data collector 102 can include a recognition feature, such as facial recognition and/or voice recognition. Such recognition features can be used to identify a user as an authorized user, e.g., providing an implicit degree of security to protect against unauthorized access. Alternatively or in addition, such recognition features can be used to distinguish instructions from among a group of different individuals in a presence of the system. Consider an office meeting in which some members may engage in conversation, while an authorized user provides input to the system 100. The system 100 distinguishes the authorized user from the other meeting members and accepts input from the authorized user while blocking or otherwise ignoring any vocalizations and/or gestures from unauthorized individuals, including the other meeting members.

In some embodiments, the data collector 102 accepts textual input from equipment of the authorized user. The equipment can include, without limitation, a keyboard and/or pointing device, e.g., of the user's desktop computer, laptop computer, tablet device, smart phone, smart television, and the like. The input can be obtained directly from a device, or indirectly from a service. Services can include, without limitation, Short Message Service (SMS), Multimedia Messaging Service (MMS), Dual-Tone-Multiple-Frequency (DTMF) input, e.g., from a telephone, email, and the like. The collected data can be obtained from a live user in a presence of the system 100, or a remote user, e.g., by way of a videoconference, a telephone call, a network connection, and the like.

A user input in the form of an instruction, an order, e.g., a task order, or a request can include a simple instruction, e.g., including a single order or task. For example, the task order might be to "Clear my calendar for this afternoon" or "Order a car service to take me to the airport in 30 minutes." Alternatively, the task order can include a complex or compound order, e.g., including a list of instructions or subtasks. For example, a complex task order might be to "Clear my calendar for this afternoon and order a car service to take me to the airport in 30 minutes.

It is understood that in at least some embodiments, the data collector 102 can include a prompt and/or feedback mechanism by which the system 100 can communicate back to the user. Without limitation, such prompts and/or feedback might include a limited number of textual and/or vocalized phrases, such as "Did you need my assistance?" or "Will that be all Ms. Johnson?". Such simple feedback items can be helpful to discern when the user is providing input to be processed by the system, and when the user has concluded providing such input.

To the extent error checking is applied by one or more modules of the system 100, additional prompts can be provided by the system 100 to the user to identify and/or resolve such errors. At least some errors can be associated with the input, e.g., if a word or phrase was inaudible, or if an interpreted word or phrase seems out of place, the user can be prompted immediately for confirmation and/or correction. Alternatively or in addition, at least some errors can be associated with the underlying instructions. For example, if the user requests that a project status meeting scheduled on the $14^{th}$ of the month be moved out one week, when in fact the meeting is scheduled on the $15^{th}$. The system can request clarification, e.g., "Did you mean to reschedule the project meeting on the $15^{th}$?".

Likewise, feedback can be provided for conflict resolution and/or clarification. Consider a user instructing and/or requesting that a financial slide from a quarterly report be included in a project summary presentation being prepared for an upcoming status meeting. To the extent there is ambiguity as to which financial slide, which quarterly report, or even which project, the system can request clarification, during the data collection phase or sometime thereafter.

In another example, the user provides a primary instruction by telling the virtual assistant to coordinate a dinner date with a client at a local restaurant, for next Tuesday at 7 pm. In this instance, the request will require multiple steps, secondary instructions or instruction components. The virtual assistant parses the primary instruction and determines that several secondary instructions will be necessary. For example, the instructions can include entering the appointment in the user's calendar, coordinating a reservation at the restaurant and inviting the client.

Continuing with the illustrative example, the assistant accesses the user's calendar to provide a calendar entry for the dinner. At this point, the virtual assistant can perform a conflict check to ensure that the user does not have a conflicting engagement. It is understood that the system 100 can include one or more conflict management modules 116, e.g., in communication with one or more of the data collector 102, the data analyzer 104, the policy or rules engine 106, the application or service controller 108, the response engine 112 and/or an AI engine 114.

To the extent that a conflicting engagement is identified, the virtual assistant can implement a conflict resolution. Conflict resolution can include one or more of notifying the user of the conflict and requesting clarification, notifying the user and proposing a suggested conflict resolution, or implementing a conflict resolution logic. Conflict resolution logic can include pre-programmed responses, e.g., identifying an order of precedence for calendar activities that allows some activities to be cancelled or moved based on other, more important activities. Alternatively or in addition, conflict resolution can include artificial intelligence and/or machine learning, e.g., resolving conflicts and/or proposing conflict resolution based on how similar conflicts have been resolved in the past.

Presuming that there are no conflicts, or that any conflicts have been resolved, the virtual assistant contacts the restaurant to make a reservation for next Tuesday at 7 pm for a party of two. Once again, conflict checking can be applied, e.g., if a reservation is not available for the requested time. Resolutions can include checking for other times according to the user's calendar, and/or other restaurants. Proposal of alternative restaurants can be based on a user response, e.g., upon notification by the virtual assistant that the venue is not available, and/or based on user preferences, e.g., according to a user profile and/or past reservations, and/or based on a machine logic and/or artificial intelligence that selects and alternative venue based on one or more characteristics, such as type of food, style of venue, location, and the like.

Having determined that the user is available and that a restaurant has been identified, the assistant can send an invitation to the client. In at least some embodiments, the assistant can confirm that the client has accepted and provide a response to the user to let her know that the dinner plans are all set. The response can include a voice response, e.g., Ms. Jones, your dinner with the client is all set for next Tuesday at 7 pm. Alternatively or in addition, the response can include a text message, and/or an email and the like.

Feedback can be provided in the same mode in which it was administered. Namely, speech output of feedback can be provided when the user is using a speech-to-text input mode. Likewise, textual output can be provided when using a textual interface, e.g., computer, mobile phone, SMS, email and the like.

The data analyzer 104 accepts collected user input from the data collector 102. It is understood that the data collector can include at least some pre-processing to the user input, e.g., converting speech to text. The data analyzer or data analytic module 104 applies a set of processing functions to further process the collected user input. In some embodiments, the data analyzer applies an input normalization function. Such input normalizations can include correcting spelling errors, replacing one or more words with accepted replacements, e.g., according to a preferred vocabulary and/or dictionary. Thus, words or phrases of the collected input can be corrected, interpreted and/or replaced with one or more suitable words or phrases. The data analyzer 104 can include and/or access one or more dictionaries and/or thesauruses. In some embodiments, the data analyzer 104 can apply stemming and/or word parsing to reduce words to their stems, prefixes and/or suffixes. Such stemming can facilitate and/or simplify interpretations, e.g., using finite dictionaries, by focusing on one or more portions of a word.

It is understood that in at least some embodiments, the system can be configured in a domain specific mode. Such configurations can include a general business domain, e.g., to assume a role of a virtual office or executive assistant or secretary. Alternatively or in addition, other domain-specific configurations can include a legal office domain, a medical office domain, surgical unit domain, and the like. Such domains can generally be configured with dictionaries, vocabularies, rules and the like, that are anticipated or otherwise associated with their respective domains. Thus, a legal office domain can be tailored to interact with certain court filing systems, legal file systems, internal groups, such as legal docketing, and the like. Such a legal office domain would not be expected to respond to surgical instructions, interact with operating room systems, hospital systems, and the like.

In at least some embodiments, the data analyzer 104 includes one or more of a syntactic processor or a semantic parsing processor. Such syntactic and/or semantic parsing processors can be used to identify distinct or otherwise separable portions of the collected user input. For example, the data analyzer 104 can parse or otherwise distinguish multiple subtask orders of a compound task order. For example, such parsing can be accomplished by periods and/or pauses encountered in the collected user input. Further examples of output segments, subtasks or chunks can include: "I would like to obtain slide one," "Go and combine it," etc.

Alternatively or in addition, the data analyzer 104 can parse or otherwise distinguish input segments or "chunks" based on a perceived grammar Namely, the data analyzer 104 can identify, distinguish or otherwise discern subject, verb and/or object of a sentence chunk. Such interpretations can be made according to generally known techniques, e.g., based on vocabulary, word placement, and the like.

By way of example, in preparing for a meeting, the collected user input includes the following subtasks or sentence chunks identified in Table 1.

TABLE 1

Example Parsed User Input.

| Ref. | Subtask |
|---|---|
| 1 | "Get me the slides from John Smith's meeting on our $1^{st}$ quarterly town hall." |
| 2 | "Find the one on the project Alpha priorities for 2016." |
| 3 | "Add that slide at the beginning of my town hall presentation for tomorrow." |
| 4 | "Email the slides to Jonathan Smith who will be managing that meeting." |
| 5 | "Let Jonathan know to reach out to me if he has any questions." |

By way of example, a parsed subtask ref. 1, includes: (i) a verb "get"; (ii) a subject "me"; (iii) an object "slides"; and an object modifier (iv) "from John Smith's meeting on our $1^{st}$ quarterly town hall.

In at least some embodiments, the data analyzer 104 provides an output that includes distinguishable subtask orders of a compound task order. Alternatively or in addition, the data analyzer 104 provides an output that identifies or otherwise parses out actions to be performed and/or objects to be used in the performance of the actions.

The policy or rules engine 106 receives parsed input from the data analyzer 104. Among various activities of policy/rules engine 106, the parsed user input segments or chunks are translated into actions and/or micro-actions. Micro-actions can include elementary actions that address, respond to or otherwise implement a task order and/or a subtask order, and/or a piece or portion of a task order and/or subtask order.

In at least some embodiments, the policy/rules engine 106 organizes the actions and/or micro-actions. Such organization can be obtained according to a logical application of the actions, micro-actions. Consider subtask ref. 2, which orders to "Find the one on project Alpha priorities for 2016." In this instance, interpretation of "the one" can be obtained from a contextual interpretation of the user input that is preceded by subtask ref. 1, in which the user requests the "slides."

The policy/rules engine 106 then concatenates the micro-actions into distinct macro-actions, such as "get the slide," "combine the slide," "email the slide," etc. The policy/rules engine 106 can performs conflict resolution and requests clarification from the user if two or more macro-actions in a sequence do not align. For example, meet with John Smith, then add the slide.

The policy/rules engine 106, upon encountering a word or phrase to be interpreted into a corresponding micro-action can apply an interpretation process or routine. In some embodiments, the term is explicit and definite, such as the object of the ref. 1 subtask. Namely, "the slides from John Smith's meeting . . . " In this instance, a translation results in a micro-action to open or otherwise access a computer file that contains the slides from John Smith's meeting. If the location of the computer file is unknown, the translation may include another preceding micro-action that conducts a search, e.g., of a hard drive, a file system, and/or a database to locate the requested file. The resulting location can be used in the micro-action to access or otherwise open the appropriate computer file.

In reference to ref. 2 subtask, however, there is some degree of uncertainty or ambiguity in the phrase "the one." In this instance, the policy/rules engine 106 can apply a logical routine to identify a meaning of "the one." For example, the logical routine can consider other subtasks and/or micro-actions to identify objects being accessed or otherwise manipulated. For instances in which multiple objects are referred to, a further logic can be applied to identify which object is most likely being referred to. In the illustrative example, a preceding subtask refers to an object, "the slides from John Smith's meeting." It is likely that "the one" refers to a preceding object, such as the Smith slides.

The logic of the policy/rules engine 106 can make an educated guess, then follow up with a validation. In the illustrative example, the user requests "the one on the project Alpha priorities for 2016." An ancillary micro-action can be included in the translation to check whether the suspected "one" is the Smith slides, by searching an opened file of the slides to identify one "on the project Alpha priorities for 2016." To the extent a corresponding slide is identified within the Smith slides, a conclusion can be reached based on the ancillary action that the interpretation of "the one" referred to the Smith slides.

To the extent that there may be other possible interpretations of "the one," other ancillary micro-actions can be implemented, e.g., to look for the one "on the project Alpha priorities for 2016" in any or all of the other candidates. The ancillary micro-actions may not directly lead to enacting a requested task, but can be helpful in a supporting role, e.g., for reduction in ambiguity, validation, and the like.

In some embodiments, an ordering is determined of the task orders, subtask orders, and/or the micro-actions. The ordering can be implied, e.g., according to a sequence in which the original task order was received during data collection. According to the illustrative example, an ordering of the subtasks identified in Table 1 can be inferred from their ordering in the instruction, e.g., according to their ref. numbers.

Alternatively or in addition, one or more of the task orders, subtask orders and/or micro-actions can be arranged, considered and/or otherwise processed according to an explicit order. It is conceivable that in at least some instances, the task orders, subtask orders and/or micro-actions will include indicia of their order. For example, the user might provide an input along the lines of "First, do A" "Then, do B." In this instance, the ordinal phrases provide an explicit indication of their intended order. Alternatively or in addition, ordering can be determined according to the orders, subtask orders and/or micro-actions. Namely, processing logic may dictate that certain tasks be completed before other tasks. Consider that a computer file including the Smith slides must be accessed before it can be opened, then opened before the requested slide can be identified, and the requested slide identified before it can be copied into the user's presentation.

In some embodiments, the policy/rules engine 106 analyzes and/or otherwise interprets the parsed user input to detect a presence or absence of interdependencies between subtasks. To the extent a subtask does not depend on another subtask, any particular ordering, at least at a subtask level, may be irrelevant. Such a lack of interdependencies provides an opportunity for efficiency. Namely, one or more subtasks can be implemented in parallel to expedite a total response time. Alternatively or in addition, such non-interdependent tasks can be implemented at an opportune time, e.g., based on one or more of processing capacity, memory usage, communication bandwidth, and the like.

The policy/rules engine 106 finally recommend a set of macro-actions for the next module to perform. It is understood that in at least some embodiments, a sequencing of the macro-actions can depend on one or more of the foregoing. Namely, the policy/rules engine 106 can determine an ordering based on necessity, e.g., dependencies, or convenience, e.g., efficiencies. The ordering can be stored, at least temporarily, in an internal data structure that can be used to orchestrate the micro-actions, subtasks and the like.

The application and/or service controller 108 receives input from the policy/rules engine 106 that identifies micro-actions. The application/service controller 108 responds to the input by facilitating and/or otherwise performing each macro-action. Continuing with the illustrative example, the macro-actions can include (i) "get the slide," (ii) "combine the slide," (iii) "email the slide."

In response to the first macro-action, the application and/or service controller 108 can access an application, such as PowerPoint® slide show presentation program. PowerPoint is a registered trademark of the Microsoft Corporation. The application can be controlled or otherwise instructed by the application and/or service controller 108 to open the Smith slides, to locate the desired slide, and to copy the slide. Likewise, in response to the second macro-action, the application and/or service controller 108 can once again use the PowerPoint® slide show presentation to open the user's presentation and to paste or otherwise combine the selected slide from the Smith presentation, and to save the updated presentation. Finally, the application and/or service controller 108 can access an email application, such as Outlook® email application to email the slide to an intended recipient. The application and/or service controller 108 can interact with one or more of applications and/or services by way of respective application program interfaces (APIs).

In at least some embodiments, the application and/or service controller 108 includes error handling. For example, if any of the foregoing example macro-action fail, the application/service controller 108 can attempt to facilitate or otherwise perform a recovery. For example, the application and/or service controller 108 returns back to the policy/rules engine 106 to request a recommendation as the task has failed. The application/service controller 108 module can be configured to collect which actions have been executed correctly, and to determine when an application has been completed successfully. Alternatively or in addition, the application/service controller 108 can be configured to collect which actions have not been executed correctly, and to determine when an application cannot be completed successfully The application/service controller 108 provides an output to the response engine 112. The response engine module 112 can be configured to synthesize a response to the user. In some embodiments, the synthesized response summarizes all of the actions taken. For example, the synthesized response can indicate that: "Your new slides have been created and set to Jonathan." Likewise, a synthesized response can include any portions of the request that could not be accomplished for any reason.

To the extent that reasons are known, the response engine 112 can provide reasons with response. Alternatively or in addition, the response engine 112 can simply identify any issues and query the user as to whether further detail should be provided. To the extent the user requires further detail, the response engine 112 can provide the details.

The response engine 112 can provide output in one or more different formats. For example, the response engine 112 can include a text-to-speech synthesizer to provide speech at an output channel. Alternatively or in addition, the response engine 112 can provide an output according to any generally accepted means of communication. This can include text, e.g., SMS, messages, email messages, voice mail messages and the like. In some embodiments, a particular form of output can be based on a format of the input. Thus, speech in can beget speech out. Text in begets text out and the like.

Alternatively or in addition, the output format is identified in the instruction. For example, a user may provide a task order using voice commands, but request that any updates or results be provided by one or more other modes, such as text message, email, and the like. In at least some embodiments, a preferred and/or default mode of providing a response can be provide in a user profile, e.g., a user configuration file.

It should be understood that an individual user may adopt more than one persona in relation to interactions with the system. For example, an executive can assume the role of executive for some activities, family member for other activities, board member for other activities and so on. It is conceivable that the system can deduce which persona might apply based on a context of the order, including content of the task order and/or where, when and how the order was received. Alternatively or in addition, the user can select or otherwise indicate which persona should apply in association with a particular task order or command. To the extent that user profiles are available, it is further understood that such profiles can include variants according to different persona of the same individual. Thus, a default or preferred communication mode to be applied by the response engine 112 can be determined according to the persona and/or a user profile.

In some embodiments, the system includes an Artificial Intelligence (AI) module 114 (shown in phantom) that can be in communication with one or more elements or modules of the system. The example AI module 114 is in communication with the Data analyzer 104, the policy engine 106 and the application controller 108. The AI module 114 can be applied to one or more of the core functions of the corresponding modules 104, 106, 108, and/or serve as a separate function.

For example, it is envisioned that the system can apply a learning function to improve performance over time. In this capacity, the AI engine 114 can monitor or otherwise track performance of the system 100, e.g., determining when task orders were performed successfully, and when some sort of complication was encountered. To the extent any complications are encountered, the AI engine 114 can include functionality to identify a source of the complication and whether the complication was ultimately resolved by the system with or without user and or operator intervention.

For instances in which a complication was resolved, including instances in which operator intervention was necessary, the AI engine 114 can alter and/or suggest alterations to functionality of the one or more modules 104, 106, 108. In this sense, when similar circumstances that led to a complication are encountered later, the altered functionality can be applied in an attempt to avoid a similar complication. In at least some embodiments, the AI engine 114 can monitor or otherwise track such altered functionalities to determine whether the altered functionality properly addresses the earlier complication. To the extent that the altered functionality does not sufficiently address the situation, the process can be repeated using variants of the altered functionality until a suitable version is obtained.

Figure 2:
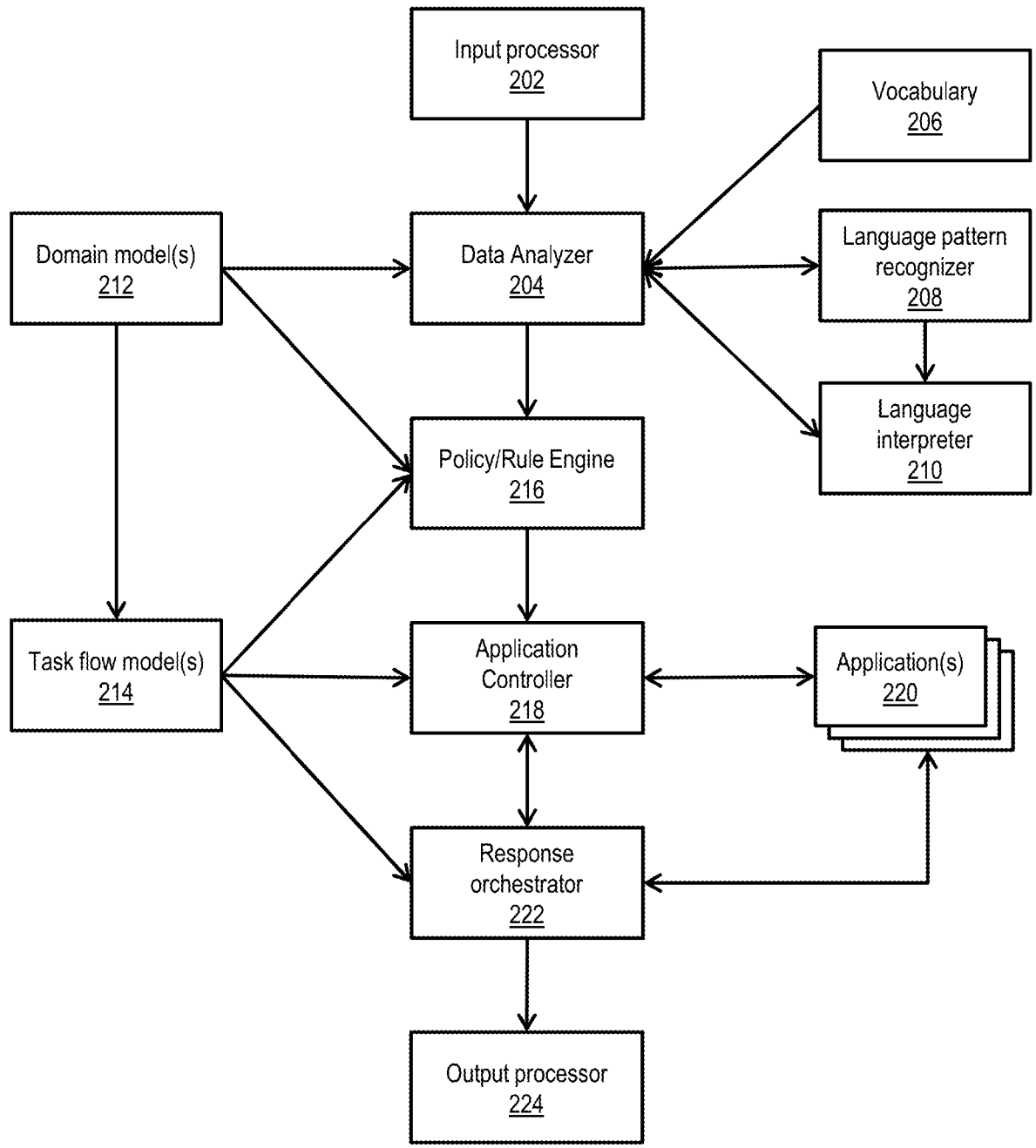
FIG. 2 depicts an illustrative embodiment of another system that supports an asynchronous virtual assistant.

FIG. 2 depicts an illustrative embodiment of another system 200 that supports an asynchronous virtual assistant. The system 200 includes an input processor 202, a data analyzer 204, a policy/rules engine 216, an application controller 218, a response orchestrator 222 and an output processor 224. In at least some embodiments, one or more of the input processor 202, the data analyzer 204, the policy/rules engine 216, the application controller 218, and the output processor 224 can operate in a similar manner to one or more of the data collector 102, the data analyzer 104, the policy/rules engine 106, the application/service controller 108 and the response engine 112 of the preceding system 100 (FIG. 1).

In more detail, the system 200 includes one or more of a vocabulary repository 206, a language pattern recognizer 208 and/or a language interpreter 210. The vocabulary repository 206 can include a dictionary or similar list of accepted vocabulary and/or alternates or variants. The vocabulary repository 206 can be stored locally on a device, such as a device implementing one or more functions of the system 200. Alternatively or in addition, the vocabulary repository 206 can be accessible by way of a network. Such online vocabulary repositories can include repositories accessible by subscription, e.g., by way of a third party, and/or vocabulary repositories provided by a supplier and/or service provider of the system 200. It is understood that more than one vocabulary repositories can be provided according to levels of subscription, application domains, custom tailored to an individual user and/or enterprise and the like.

Likewise, one or more of the language pattern recognizer 208 and/or the language interpreter 210 can be stored locally on the device and/or accessible by way of a network. Once again, such online language pattern recognizers and/or the language interpreters can include repositories accessible by subscription, e.g., by way of a third party, and/or provided by a supplier and/or service provider of the system 200. It is understood that more than one of either of the language pattern recognizer and/or the language interpreter can be provided according to levels of subscription, application domains, custom tailored to an individual user and/or enterprise and the like.

To the extent that AI is applied to the system 200, it is understood that AI can be applied to one or more of the vocabulary repository 206, the language pattern recognizer 208 and/or the language interpreter 210. The AI can operate to apply a machine learning, e.g., based on current and/or past performance to tailor or otherwise modify operation of one or more of the modules 206, 208, 210 to improve performance for current and/or future applications. For example, language pattern recognizer 208 can adapt to a particular style of speaking and/or writing of a particular user. Since it is understood that the system 200 can be used by more than one individual, it is further understood that any such modifications based on AI can be distinguished into at least two categories: ones that apply to every user and others that apply to a particular user. In this regard, it is understood that AI modifications adopted by one or more of the modules 206, 208, 210 can be apportioned to particular users.

Consider that the system 200 can adopt a profile based on the current user. The adopted profile can be saved separately in a profile repository. When loaded, the profiles can adapt functionality of one or more modules of the system 200 based on one or more of user preferences, AI improvements to functionality and the like. It is understood that in at least some embodiments, a system administrator can create, modify, and/or delete one or more user profiles, as needed.

In still more detail, the system 200 includes one or more of a domain model repository 212 and/or a task flow model repository 214. The domain model repository 212 can include one or more features that when applied to the system 200, improve or otherwise facilitate application of system functionality to a particular domain. Domains can include, without limitation, business disciplines, e.g., an enterprise versus a small business, technical disciplines, e.g., biotechnology versus software, and professional disciplines, e.g., medicine versus legal services.

It is understood that in at least some instances one or more of the domain models 212 and/or task flow models 214 can include functionality developed for a specific application and/or user. For example, a large corporate enterprise with multiple varied divisions might include one or more of a common domain model directed to the enterprise and/or one or more additional domain models directed to particular divisions.

Likewise, task flow models 214 can be tailored and/or otherwise directed to one or more of the enterprise and/or its varied divisions. It is further understood that task flow models 214 can be customized according to business rules and/or policies. Such customized task flows can correspond to a particular domain model, and/or a particular user. Alternatively or in addition, such customize task flows can be based on other factors, such as subject matter of the task orders, content of the micro/macro-actions and the like.

The response orchestrator 222 can be in communication with one or more of the application controller 218, the applications/services 220, the output processor 224 and/or the task flow model repository 214. In some embodiments, the response orchestrator 222 obtains a task flow model from the task flow model repository 214. The task flow model provides guidance as to orchestration of a response to the user input. Particular task flow models can correspond to task orders, sub-task orders, macro-actions and even micro-actions.

In some instances, AI can be applied to the response orchestrator 222, e.g., measure and/or otherwise determining an effectiveness of any applied orchestrations. To the extent improvements are determined, e.g., by way of machine learning principles, the improvements may suggest improvements to a corresponding applied task flow model 214. In this instance, the AI can work in tandem with one or more modules of the system, such as the response orchestrator 222 and the task flow repository to modify a task flow, as required and to store the modified task flow for future application according to the techniques disclosed herein.

It is envisioned that the techniques disclosed herein will transform the way in which users interact with machines, e.g., computers, machines according to the Internet of Things (IoT) and the like, creating opportunities to drive cost saving and new monetization opportunities. Supervisors can instruct a computer to perform a serious of instructions. By way of non-limiting example, the instructions may relate to developing a presentation, handling a customer care transaction, a sales transaction, a technical repair issue, etc. Managers can instruct a computer to find better rates and packages for a particular customer. Service providers, such as network and/or computing resource, i.e., "cloud" services providers, can provide such capabilities to their consumers and enterprise customers, and/or sell similar solutions as stand-alone products in the market.

Figure 3:
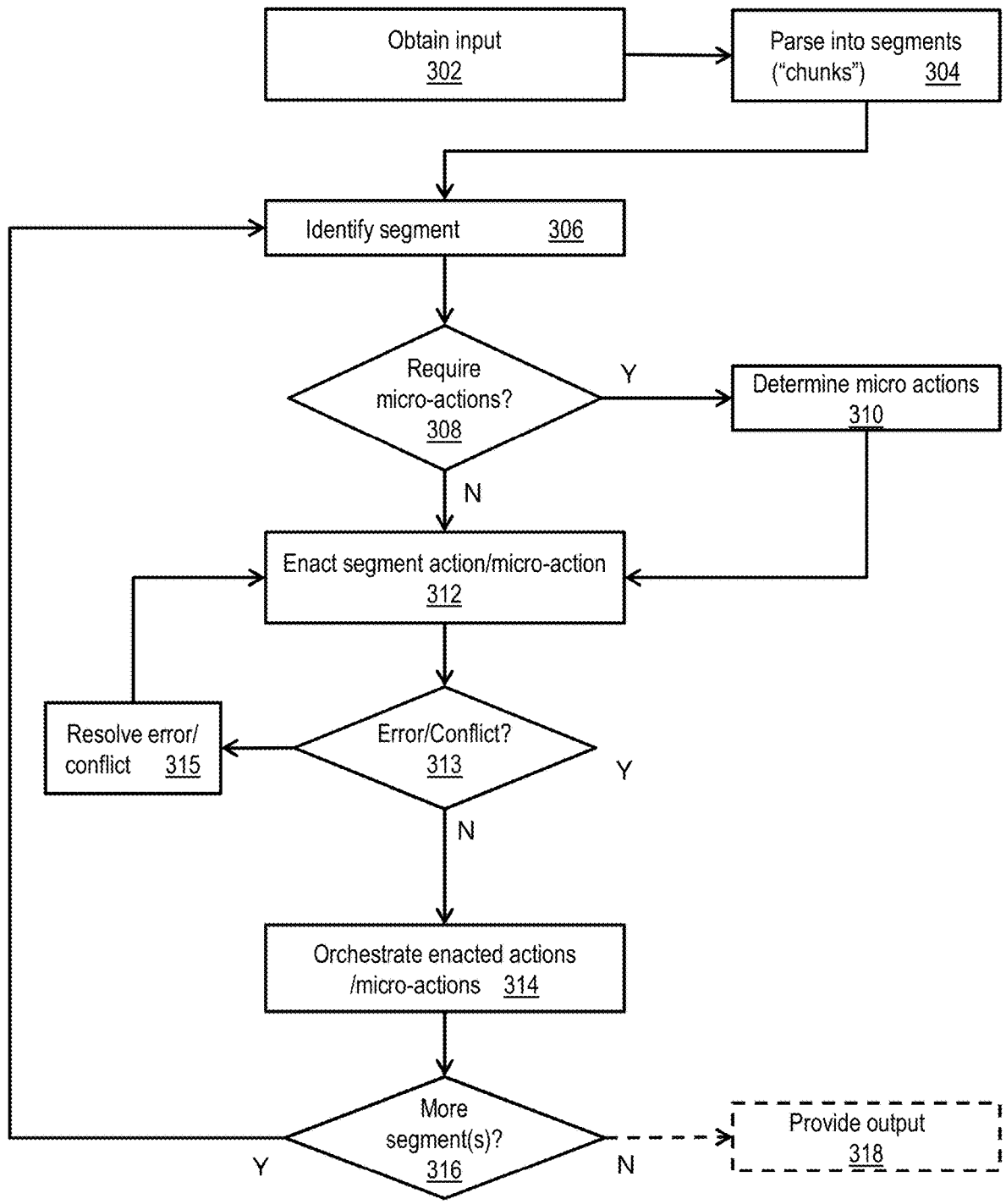
FIG. 3 depicts an illustrative embodiment of a process used in portions of the system described in FIGS. 1 and 2.

FIG. 3 depicts an illustrative embodiment of a process 300 used in portions of the system described in FIGS. 1-2. A user input is obtained at 302. The user input can be obtained according to any suitable manner or mode, include the examples included herein. Namely, the user input can be obtained at 302 by way of a speech-to-text processor. The user can address the virtual assistant as one would address a personal assistant. For example, the assistant can be addressed by a name, e.g., "Wanda" that can be pre-assigned and/or assigned by the user.

The virtual assistant accepts verbal input from the user. The interaction between the user and the virtual assistant can be asynchronous. For example, the user may provide one instruction that is enacted upon by the virtual assistant without the virtual assistant providing an acknowledgment. The virtual assistant can determine a beginning and an end of a user input session. In some embodiments, the beginning and end can be identified by keywords and/or phrases issued by the users. For example, the user may indicate a beginning of a user input session by saying, "Wanda, please take care of . . . " or some similar phrase. Similarly, the user may indicate a conclusion of a user input session by saying "Thank you, Wanda. That will be all for now," or some similar phrase. In some embodiments, a prolonged silence, nonverbal utterance and/or gesture can be used alone or in combination with a word or phrase to identify beginning and/or end of a user input session.

The user can provide multiple commands or instructions to the virtual assistant in succession, without expecting or receiving any corresponding feedback from the virtual assistant. Namely, the virtual assistant can patiently accept a series of instructions before acknowledging and/or providing any sort of reply. It is understood that in at least some embodiments, the virtual assistant can begin processing a partial input, e.g., according to the following steps, while still engaging in an active user input session.

The user input is parsed into segments or "chunks" at 304. For example, text resulting from the speech-to-text processing can be parsed into segments or chunks. To the extent that the input includes a task order that includes multiple sub-tasks, the parsing can include parsing the individual sub-tasks. It is understood that further parsing can be applied to identify content of each sub-task for further processing, e.g., subjects, verbs, objects, modifiers, etc. In at least some embodiments the parsing can be accomplished with the assistance of one or more of a vocabulary repository 206, a language pattern recognizer 208 and/or a language interpreter 210 (FIG. 2).

A particular segment or chunk is identified at 306. In some embodiments, the segments or chunks are temporarily stored in one or more buffers. In some embodiments, a buffer can be associated with those segments or chunks that are implemented according to a particular order. Multiple buffers can be applied to tasks that can be completed in parallel.

A determination is made at 308 as to whether the identified segment requires micro-actions. To the extent micro-actions are applicable, they are determined at 310, and the micro-action is enacted at 312. To the extent that micro-actions are not applicable the particular segment action is enacted at 312.

In at least some embodiments, error checking and/or conflict management is applied. For example, in the illustrative embodiment, a determination is made at 313 whether there are any errors and/or conflicts based on the input and/or the micro-actions. To the extent that any errors and/or conflicts are identified, they can be resolved, e.g., at 315. Having been resolved, the process can continue, e.g., by enacting the segment action/micro-action at 312.

The actions and/or micro-actions are orchestrated at 314. In at least some embodiments, orchestration can include application of a task flow model 214 (FIG. 2). Orchestration can control which applications and/or services 220 are accessed in which order. Alternatively or in addition, orchestration can facilitate obtaining interim results in an efficient order to execute processing of the task and/or sub-task.

A determination is made at 316 as to whether more segments are available for processing. To the extent that there are more segments, processing continues by identifying another segment or chunk at 306. The process continues from this point according to the preceding description until a determination is made at 316 that no further segments are available for processing.

An output is optionally provide at 318 (shown in phantom). In some instances, the output indicates that the requested task order has been completed. Alternatively or in addition, the output can provide incremental status updates, e.g., subtask 1 completed, subtasks 2 and 3 remaining. To the extent that a subtask cannot be completed and/or that some difficulty was encountered, an output can be provided indicating such status.

Alternatively or in addition, an output can be provided that request supplemental input from the user. To the extent further input is obtained, a task order being processed can be revised or otherwise modified to proceed according to the supplemental input. For example, if a user orders the system 200 to schedule travel including airlines, ground transportation and hotel according to preferred flights, carriers and/or hotels, but one or more of the preferred entities are not available, the user can be prompted for alternates. Namely, the system 200 by way of the output 318 can ask the user whether a flight time can be adjusted to accommodate booking on a preferred air carrier, or whether alternative flights on another carrier should be pursued to maintain a preferred schedule.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
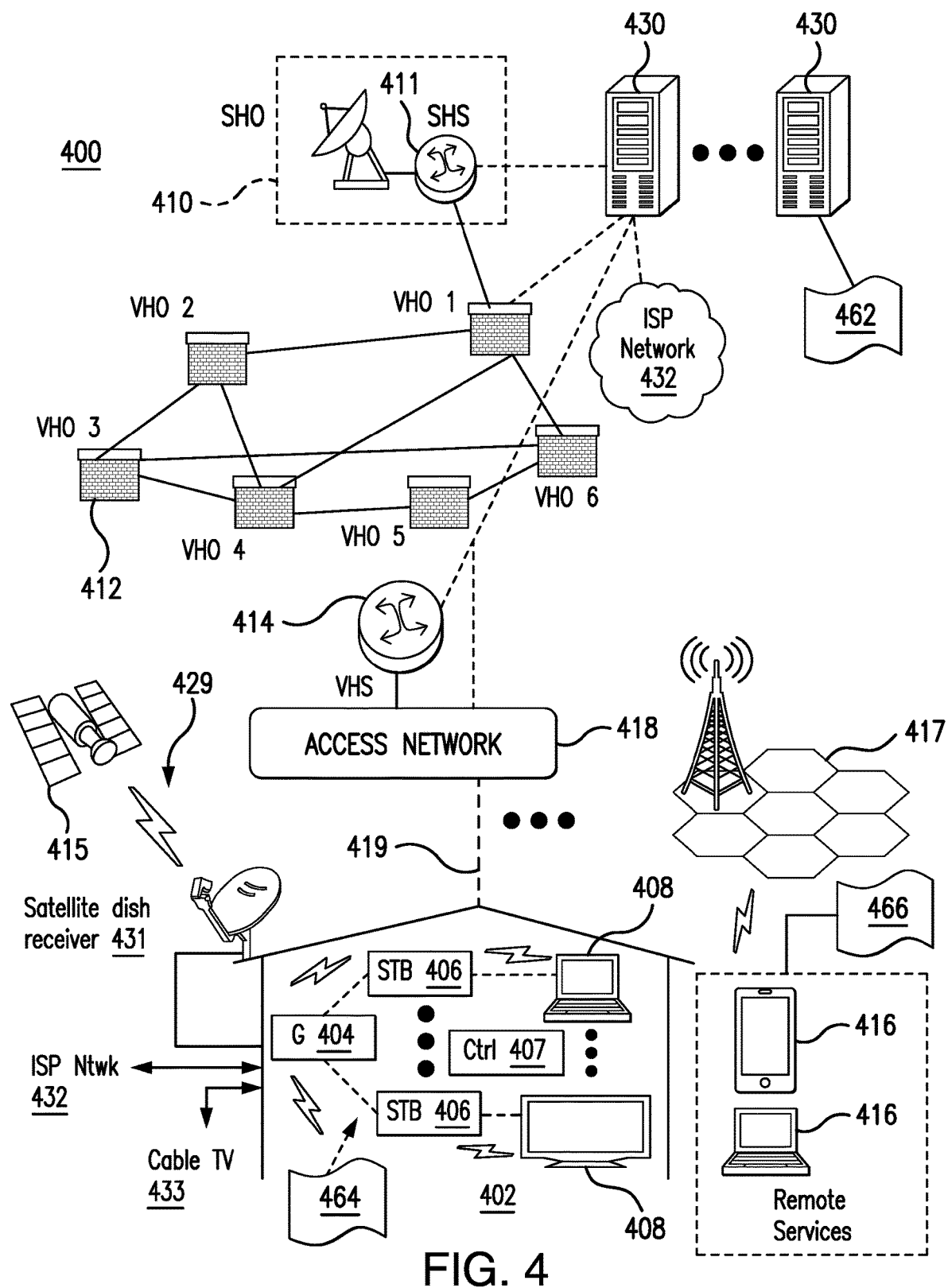
FIGS. 4-5 depict illustrative embodiments of communication systems that provide media services that can be accessed or otherwise requested, provisioned and/or controlled by the systems described in FIGS. 1 and 2.

FIG. 4 depicts an illustrative embodiment of a first communication system 400 for delivering media content. The communication system 400 can represent an Internet Protocol Television (IPTV) media system. Communication system 400 can be overlaid or operably coupled with systems supporting virtual asynchronous assistants 100, 200 FIGS. 1 and/or 2 as another representative embodiment of communication system 400. For instance, one or more devices illustrated in the communication system 400 of FIG. 4 can support one or more functions of a virtual asynchronous assistant that obtains an input comprising an order, identifies a number of activities based on the order, facilitates initiation of the activities, and determines a result based on the activities, wherein the result is responsive to the order.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a virtual asynchronous assistant system (herein referred to as a virtual assistant processor 430). The virtual assistant processor 430 can use computing and communication technology to perform function 462, which can include among other things, the virtual asynchronous assistant processing techniques described by the process 300 of FIG. 3. For instance, function 462 of server 430 can be similar to the functions described one or more of the modules 102, 104, 106, 108, 112, 114 of FIG. 1, and/or one or more of the modules 202, 204, 206, 208, 210, 212, 214, 216, 218, 224 of FIG. 2 in accordance with process 300 of FIG. 3. The media processors 406 and wireless communication devices 416 can be provisioned with software functions 464 and 466, respectively, to utilize the services of virtual assistant processor 430. For instance, functions 464 and 466 of media processors 406 and wireless communication devices 416 can be similar to the functions described for the systems 100, 200 of FIGS. 1 and 2 in accordance with the process 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
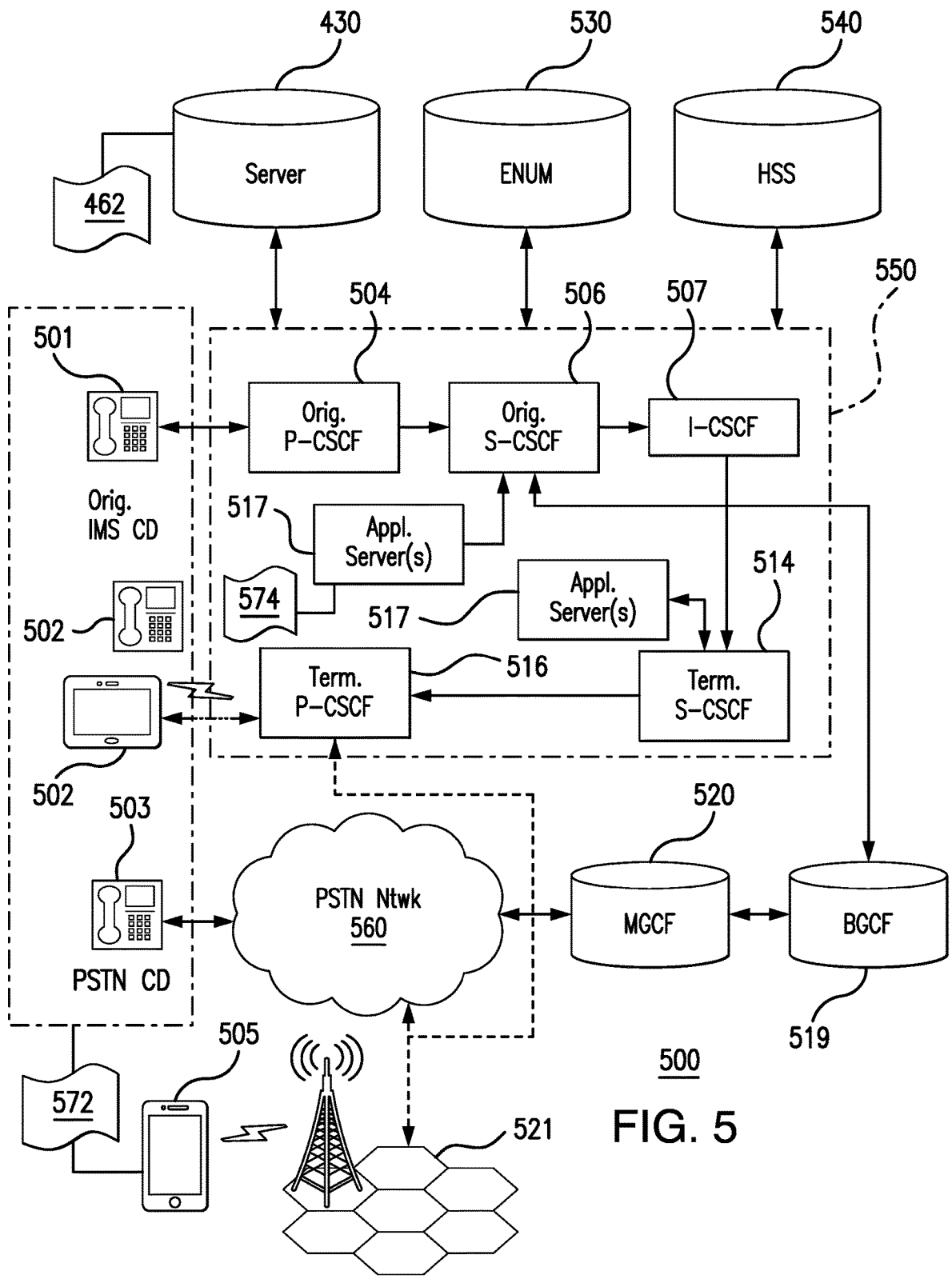

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with the system 100, 200 of FIGS. 1 and/or 2 and communication system 400 as another representative embodiment of communication system 400. One or more devices illustrated in the communication system 500 of FIG. 5 can support one or more functions of a virtual asynchronous assistant that obtains an input comprising an order, identifies a number of activities based on the order, facilitates initiation of the activities, and determines a result based on the activities, wherein the result is responsive to the order.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The virtual assistant processor 430 of FIG. 4 can be operably coupled to communication system 500 for purposes similar to those described above. The virtual assistant processor 430 can perform function 462 and thereby provide virtual asynchronous assistant services to the CDs 501, 502, 503 and 505 of FIG. 5, similar to the functions described for the systems 100, 200 of FIGS. 1 and 2, and the virtual assistant processor 430 of FIG. 4, in accordance with the process 300 of FIG. 3. CDs 501, 502, 503 and 505, which can be adapted with software to perform function 572 to utilize the services of the virtual assistant processor 430, similar to the functions described for the systems 100, 200 of FIGS. 1 and 2 in accordance with the process 300 of FIG. 3. The virtual assistant processor 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
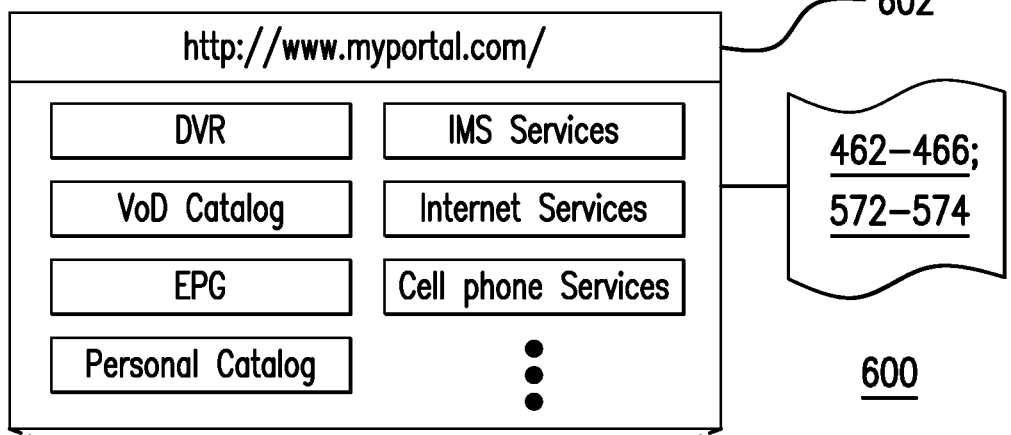
FIG. 6 depicts an illustrative embodiment of a web portal for interacting with the communication systems that can be accessed or otherwise requested, provisioned and/or controlled by the systems described in FIGS. 1, 2, 4 and 5.
Figure 6:

FIG. 6 depicts an illustrative embodiment of a web portal 602 of a communication system 600. Communication system 600 can be overlaid or operably coupled with the systems 100, 200 of FIGS. 1 and/or 2, communication system 400, and/or communication system 500 as another representative embodiment of systems 100, 200 of FIGS. 1 and/or 2, communication system 400, and/or communication system 500. The web portal 602 can be used for managing services of systems 100, 200 of FIGS. 1 and/or 2, and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-572 to adapt these applications as may be desired by subscribers and/or service providers of systems 100, 200 of FIGS. 1 and/or 2, and communication systems 400-500. For instance, users and/or operators, e.g., support operators or service provider operations, of the services provided by virtual assistant server 430 can log into their on-line accounts and provision the servers 110 or virtual assistant server 430 with domain selections, data collection and/or output/status reporting preferences, and so on. Service providers can log onto an administrator account to provision, monitor and/or maintain the systems 100, 200 of FIGS. 1 and/or 2 or the virtual assistant server 430.

Figure 7:
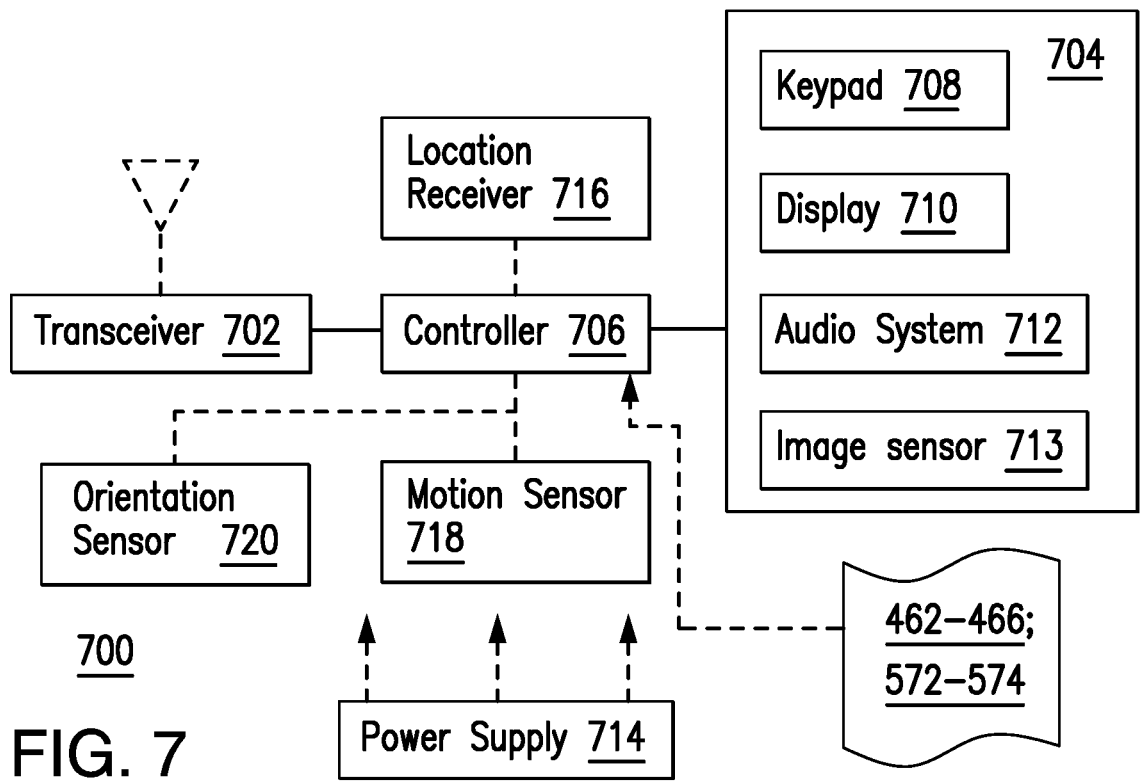
FIG. 7 depicts an illustrative embodiment of a communication device that provides or otherwise supports an asynchronous virtual assistant, such as the systems described in FIGS. 1 and 2.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform portions of the process 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the systems 100, 200 of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the virtual assistant processor can include a learning phase in which a user is prompted to respond to one or more questions, selections and/or practice tasks. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
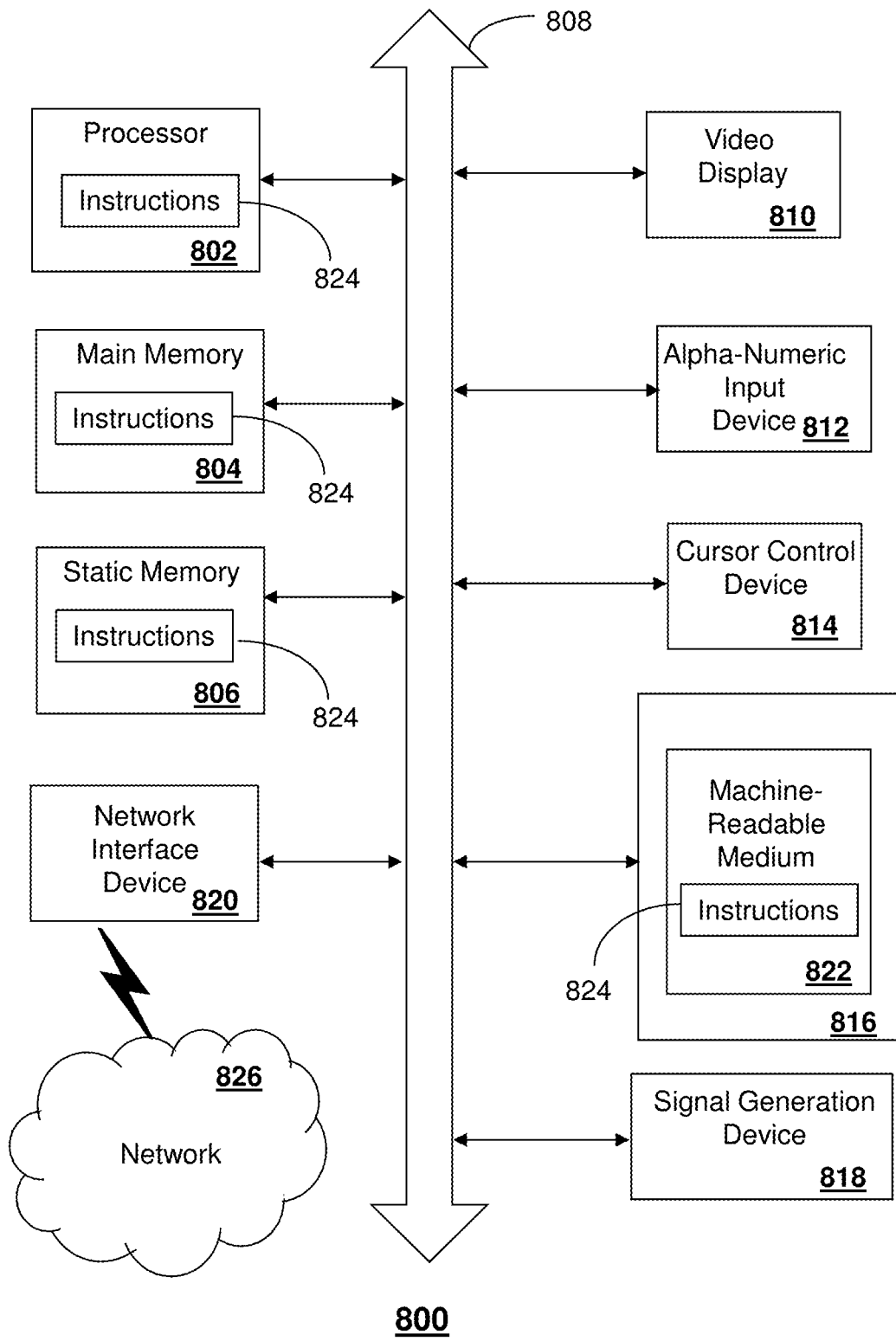
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the virtual assistant processor 430, the media processor 406 the data collector, the data analyzer 104, 204, the policy/rules engine 106, 216, the application controller 108, 218, the response engine 112, and/or the AI engine 114, the input processor 202, the response orchestrator 222, the output processor 224, the domain model repository 212, the task flow model repository 214, the vocabulary repository 206, the language pattern recognizer 208, the language interpreter 210, and other devices of FIGS. 1-2. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    obtaining, by a processing system comprising a processor, an input from equipment of a user, wherein the input comprises a task request;
    identifying, by the processing system, first actions based on the input, wherein the first actions include an elementary action that addresses a task order associated with the task request, a subtask order associated with the task request, a portion of the task order associated with the task request or a portion of the subtask order associated with the task request;
    generating, by the processing system, second actions, wherein each of the second actions comprises a concatenation of at least two of the first actions;
    modifying, by the processing system, at least one of the second actions responsive to identifying a conflict associated with the second actions, resulting in modified second actions;
    performing, by the processing system, the modified second actions; and
    adopting, by the processing system, a profile based on an identity of the user, wherein the adopting the profile results in modifications to a module that is utilized by the processing system during at least one of the identifying the first actions, the generating the second actions, or a combination thereof.

2. The method of claim 1, wherein the input comprises a voice input, and further comprising obtaining, by the processing system, a textual input based on the voice input.

3. The method of claim 1, further comprising requesting, by the processing system, supplemental input, wherein the modifying the at least one of the second actions is based on the supplemental input.

4. The method of claim 1, further comprising parsing, by the processing system, the input.

5. The method of claim 4, further comprising:
determining, by the processing system, a sequence in which the first actions are initiated.

6. The method of claim 1, wherein the modifying the at least one of the second actions comprises requesting clarification from the user for the conflict.

7. A system, comprising:
a processing system including a processor; and
a memory that stores executable instructions that, when executed by the processing system, facilitate performance of operations, the operations comprising:
  obtaining an input from equipment of a user, wherein the input comprises a task request;
  identifying first actions based on the input;
  generating second actions, wherein each of the second actions comprises a concatenation of at least two of the first actions;
  determining a conflict associated with the second actions;
  requesting supplemental input associated with resolving the conflict;
  modifying at least one of the second actions responsive to the supplemental input resulting in modified second actions;
  performing the modified second actions; and
  adopting, by the processing system, a profile based on an identity of the user.

8. The system of claim 7, wherein the input comprises a vocalized input, and wherein the operations further comprise converting the vocalized input to a machine-interpretable input.

9. The system of claim 7, wherein the first actions include an elementary action that addresses a task order associated with the task request, a subtask order associated with the task request, a portion of the task order associated with the task request or a portion of the subtask order associated with the task request, and wherein the operations further comprise parsing the input.

10. The system of claim 7, wherein the operations further comprise determining a sequence in which the first actions are initiated.

11. The system of claim 7, wherein the adopting the profile results in modifications to a module that is utilized by the processing system during the identifying the first actions.

12. The system of claim 7, wherein the adopting the profile results in modifications to a module that is utilized by the processing system during the generating the second actions.

13. A non-transitory, machine-readable storage medium, comprising executable instructions that, when executed by a processing system including a processor, facilitate performance of operations, the operations comprising:
  obtaining an input from equipment of a user, wherein the input comprises a task request;
  identifying first actions based on the input;
  generating second actions, wherein each of the second actions comprises a concatenation of at least two of the first actions;
  modifying at least one of the second actions responsive to identifying a conflict associated with the second actions, resulting in modified second actions;
  performing the modified second actions; and
  adopting a profile based on an identity of the user, wherein the adopting the profile results in modifications to a module that is utilized by the processing system during at least one of the identifying the first actions, the generating the second actions, or a combination thereof.

14. The non-transitory, machine-readable storage medium of claim 13, wherein the input comprises a voice input, wherein the operations further comprises obtaining a textual input based on the voice input.

15. The non-transitory, machine-readable storage medium of claim 13, wherein the operations further comprise:
  requesting supplemental input, wherein the modifying the second actions is based on the supplemental input.

16. The non-transitory, machine-readable storage medium of claim 15, wherein the modifying the second actions comprises requesting clarification from the user for the conflict.

17. The non-transitory, machine-readable storage medium of claim 13, wherein the first actions include an elementary action that addresses a task order associated with the task request, a subtask order associated with the task request, a portion of the task order associated with the task request or a portion of the subtask order associated with the task request, and wherein the operations further comprise parsing the input.

18. The non-transitory, machine-readable storage medium of claim 13, wherein the input comprises a vocalized input, and wherein the operations further comprise converting the vocalized input to a machine-interpretable input.

19. The non-transitory, machine-readable storage medium of claim 13, wherein the operations further comprise parsing the input.

20. The non-transitory, machine-readable storage medium of claim 13, wherein the operations further comprise determining a sequence in which the first actions are initiated.

* * * * *